Jan. 21, 1930.                M. TRECHSEL                1,744,250
COOLING DEVICE FOR RECIPROCATING PISTONS
Filed May 22, 1928
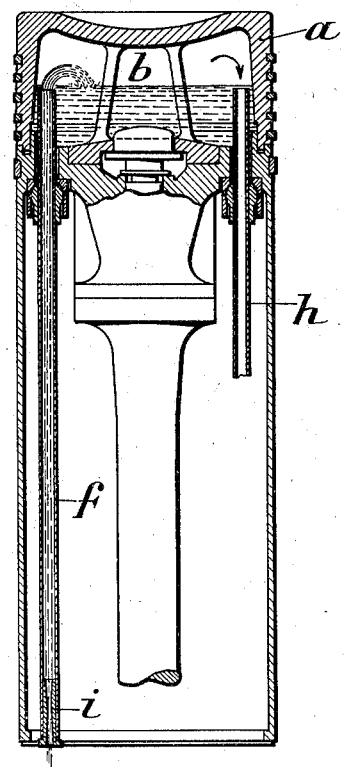
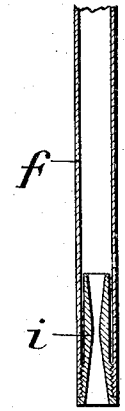
Fig.2.
Fig.1.
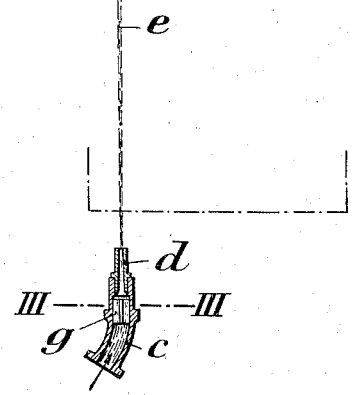
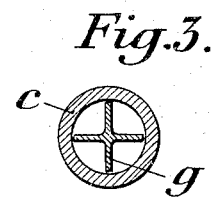
Fig.3.
INVENTOR
Max Trechsel
BY
Pennie, Davis, ...  Edmonds
ATTORNEYS Patented Jan. 21, 1930

1,744,250

UNITED STATES PATENT OFFICE

MAX TRECHSEL, OF WINTERTHUR, SWITZERLAND, ASSIGNOR TO THE FIRM SULZER FRÈRES SOCIÉTÉ ANONYME, OF WINTERTHUR, SWITZERLAND

COOLING DEVICE FOR RECIPROCATING PISTONS

Application filed May 22, 1928, Serial No. 279,692, and in Switzerland June 13, 1927.

This invention relates to cooling devices for reciprocating pistons of the kind in which a jet of water or other cooling medium is injected into the piston. The object of the invention is to reduce losses of water which at present occur at the point where the water enters the piston or the inlet pipe mounted thereon.

According to this invention the cooling jet is injected into the piston through a cone or nozzle with the taper gently narrowing from the inlet side the cross-section of the nozzle at its narrowest point being approximately the same as that of the jet. The conical inlet nozzle is mounted on the piston or near the free end of the inlet pipe which reciprocates with the piston and in the preferred arrangement is of Venturi shape so as to prevent losses either through a return flow or through the jet impinging against the walls of the inlet nozzle.

One construction according to this invention is illustrated by way of example in the accompanying drawings, in which Figure 1 is a vertical section, Figure 2 is a similar view on an enlarged scale showing the inlet nozzle illustrated in Figure 1, and Figure 3 is a section, also on an enlarged scale, on the line III—III of Figure 1.

The construction illustrated shows the piston $a$ of a vertical internal combustion engine provided with a cooling chamber $b$ into which cooling water from a fixed supply pipe $c$ having a mouthpiece $d$ is injected in the form of a free jet $e$. Secured to the piston in the known manner so as to surround the jet is an inlet pipe $f$ and also a second pipe $h$, through which the cooling water admitted through the pipe $f$ is discharged from the cooling chamber. The lower end of the pipe $f$ is provided with a nozzle $i$ which is formed into a gently tapering or slender cone the narrowest cross-section of which corresponds approximately to the cross-section of the jet. This nozzle is preferably of Venturi shape as shown, so that a relatively wide passage is provided at the lower end against which the jet impinges as well as at its upper end nearest the piston head.

Thus, in the first place a return flow of the cooling water through the inlet pipe $f$ is prevented, and secondly, owing to the gentle taper of the inlet nozzle $i$, the water losses caused by the jet impinging against the lower conical wall are reduced to a minimum. These losses are further reduced by making the mouth-piece $d$ of the supply pipe also in the form of a gently tapering conical nozzle, and by providing this mouthpiece with a cross shaped guide or baffle $g$ (Figure 3) which steadies the flow of water before it reaches the reduced open end of the mouthpiece.

I claim:—

1. In a cooling device for a reciprocating engine piston having a cooling chamber, the combination of an intake nozzle on the piston communicating with the cooling chamber therein, and a stationary discharge nozzle adapted to direct a jet of cooling medium into said intake nozzle, said intake nozzle having an inwardly tapering bore the narrowest cross section of which is substantially the same as that of the jet.

2. In a cooling device for a reciprocating engine piston having a cooling chamber, the combination of an intake nozzle on the piston communicating with the cooling chamber therein, and a stationary discharge nozzle adapted to direct a jet of cooling medium into said intake nozzle, said intake nozzle having a bore of Venturi shape the narrowest cross section of which is substantially the same as that of the jet.

In testimony whereof I have affixed my signature.

MAX TRECHSEL.